(12) United States Patent
Kojima

(10) Patent No.: US 6,829,773 B1
(45) Date of Patent: Dec. 7, 2004

(54) DEVICE FOR RECORDING OR REPRODUCING SIGNAL ON OR FROM DISK WITH A RELEASING MECHANISM

(75) Inventor: Yasushi Kojima, Nishinomiya (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 407 days.

(21) Appl. No.: 09/926,458

(22) PCT Filed: Jul. 5, 2000

(86) PCT No.: PCT/JP00/04506

§ 371 (c)(1),
(2), (4) Date: Nov. 7, 2001

(87) PCT Pub. No.: WO01/04891

PCT Pub. Date: Jan. 18, 2001

(30) Foreign Application Priority Data

Jul. 9, 1999 (JP) .......................... 11-195294

(51) Int. Cl.[7] ............................. G11B 17/03
(52) U.S. Cl. .................................... 720/640
(58) Field of Search ...................... 369/77.2; 360/99.05, 360/99.06, 99.12

(56) References Cited

U.S. PATENT DOCUMENTS

| 4,949,205 A | * | 8/1990 | Tezuka ..................... 360/99.05 |
| 5,625,612 A | * | 4/1997 | Tozune et al. ............. 369/77.2 |
| 6,344,945 B1 | * | 2/2002 | Ariyoshi .................. 360/99.06 |
| 6,388,835 B1 | * | 5/2002 | Ariyoshi .................. 360/99.12 |

FOREIGN PATENT DOCUMENTS

| JP | 2000-113549 | 4/2000 |
| JP | 2000-251369 | 9/2000 |
| JP | 2000-339811 | 12/2000 |

OTHER PUBLICATIONS

Kojima; U.S. patent application Ser. No. 09/926,159; filed Sep. 14, 2001.

* cited by examiner

*Primary Examiner*—Tianjie Chen
(74) *Attorney, Agent, or Firm*—Armstrong, Kratz, Quintos, Hanson & Brooks, LLP

(57) ABSTRACT

In a signal recording or reproduction device for disks, release means for disengaging a lock slide from a holder when the holder is pivotally moved upward from a lowered position has a release piece slanting with respect to a plane containing a path of pivotal movement of the holder, attached at a base end thereof to a chassis and deformable by deflecting outward. The release piece extends from its base end along cartridge inserting and unloading directions. The release piece escapes from the lock slide by being deflected outward for deformation by contact with the lock slide when the slide is moved with the descent of the holder, and restores itself elastically upon passage of the lock slide. The lock slide as brought into contact with the lower end of the release piece when the holder is pivotally raised from the lowered position is disengaged from the holder by being so deflected for deformation.

3 Claims, 10 Drawing Sheets

DEVICE FOR RECORDING OR REPRODUCING SIGNAL ON OR FROM DISK WITH A RELEASING MECHANISM

TECHNICAL FIELD

The present invention relates to signal recording or reproduction devices for disks enclosed in cartridges.

BACKGROUND ART

FIGS. 11A, 11B and 11C are side elevations of a conventional signal recording or reproduction device for disks. A holder 2 is pivotally supported at one end thereof by a chassis 1 provided with a turntable 73. A cartridge 6 having the disk enclosed therein is inserted into the holder 2. A lock slide 4 to be pushed by the cartridge 6 is provided on the holder 2 and movable in cartridge inserting and unloading directions. As will be described later, the lock slide 4 holds the cartridge 6 as inserted in the holder 2, and is biased in the cartridge unloading direction by a tension spring 8 in engagement with the slide 4 and the holder 2. In the following description, the cartridge inserting direction will be referred to as "front," and the unloading direction as "rear."

The lock slide 4 is provided at its front end with an engaging hook 40 which is downwardly deflectable for deformation. Positioned in front of the engaging hook 40 is a lug 23 projecting from the holder 2. When the lock slide 4 is moved forward against the tension spring 8 by the insertion of the cartridge into the holder 2, the engaging hook 40 deflects once and thereafter comes into engagement with the lug 23 as seen in FIG. 11B. When the holder 2 is pivotally moved down, the turntable 73 on the chassis 1 faces the bottom surface of the holder 2, and the device is made ready to record or reproduce signals.

Provided on the chassis 1 is release means 10 which will be described later. When the holder 2 is raised from a lowered position as seen in FIG. 1C, the release means 10 disengages the hook 40 from engagement with the lug 23. The lockslide 4 is moved rearward by the tension spring 8 and returned to the position shown in FIG. 11A.

FIG. 12 is a perspective view of the release means 10 and a primary portion of the holder 2. The engaging hook 40 of the lock slide 4 has a push plate 41 projecting laterally from the hood base end. The release means 10 is formed by bending a metal plate. A support wall 12 upstanding from the chassis 1 has a release piece 11 projecting inward and slanting downward.

FIG. 13 is a view of the release means 10 of FIG. 12 as it is seen from the direction of arrow A. With the downward pivotal movement of the holder 2, the push plate 41 of the lock slide 4 pushes the release piece 11 downward as shown in FIG. 13. An allowance for the engagement of the push plate 41 with the release piece 11 is indicated at L. Since the engaging hook 40 shown in FIG. 12 is restrained from deforming by upward deflection by contact with the lower surface of the lug 23, the release piece 11 is temporarily deflected counterclockwise as indicated in a chain line in FIG. 13, permitting the passage of the push plate 41. Upon the push plate 41 moving past the release piece 11, the release piece restores 11 itself elastically.

When the holder 2 is raised from the lowered position, the upper surface of the push plate 41 comes into contact with the lower end of the release piece 11. The release piece 11 pushes the push plate 41 down, releasing the engaging hook 40 from the lug 23 as shown in FIG. 1C.

However, the device described has the following problem.

It is commercially desired that devices of this type be compact and shortened also in lateral width. Accordingly, the release piece 11 needs to be shortened also in lateral width M (see FIG. 13). Since the width M is small, however, it is likely that the release piece 11 will not restore itself elastically owing to plastic deformation if the amount of deflective deformation of the release piece 11 is great. To compact the device while eliminating this likelihood, the amount of deflective deformation of the release piece 11 is diminished by reducing the allowance L for the engagement of the push plate 41 with the release piece 11.

Because of the reduced allowance L, nevertheless, the engaging hook 40 will not be released from the lug 23 with stability if the position where the release means 10 is mounted differs from device to device. Thus, there is the likelihood that the engaging hook 40 will not be released from the lug 23 accurately.

An object of the present invention is to render the engaging piece releasable from the lug with good stability when the holder is raised even if the release piece has a small lateral width.

DISCLOSURE OF THE INVENTION

Release means is mounted on a chassis 1 for disengaging a lock slide 4 from a holder 2 when the holder 1 is pivotally moved upward from a lowered position. The release means has a release piece 11 slanting with respect to the plane of pivotal movement of the holder 2 and attached at a base end thereof to the chassis 1, the release piece 11 being deformable by deflecting outward and extending from its base end toward a cartridge inserting-unloading direction.

The release piece 11 is movable between a deflected position to which the release piece is elastically deformed outward by being pushed by the lock slide 4 when the holder 2 is lowered to permit passage of the lock slide 4 and a standby position in which the release piece 11 restores itself elastically and disengages the lock slide 4 from the holder 2 by coming into contact with the lock slide 4 when the holder 2 is pivotally moved upward from the lowered position.

BEST MODE OF CARRYING OUT THE INVENTION

With reference to the drawings, an embodiment of the present invention will be described below in detail.

[General Description of Cartridge]

Figure 3:
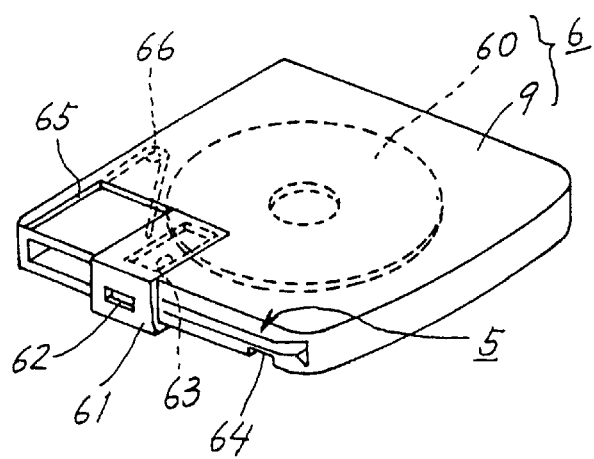
FIG. 3 is a perspective view of a cartridge proposed by the present applicant.

FIG. 3 is a perspective view of a cartridge 6 proposed by the present applicant. The cartridge 6 comprises a flat shell 9 having accommodated therein a disk 60. The shell 9 has a side face having a slit 5 and an upper wall having a recessed portion 65. An aperture 63 is formed in the recessed portion 65 for exposing the disk 60. A shutter 61 for covering the aperture 63 is slidably disposed in the recessed portion 65 and fitted over the slit 5. The upper surface of the shutter 61 is positioned in the same plane as the upper surface of the shell 9. The shutter 61 is biased toward a closing direction by a torsion spring 66 within the shell 9 and is automatically closed even if opened inadvertently. A caved portion 64 is formed in the bottom wall of the cartridge 6. A slide member 3 is engageable in the caved portion 64 as will be described later. With the shutter 61 opened, the disk 60 within the shell 9 is partly exposed to record signals thereon or reproduce signals therefrom.

[Overall Construction of the Device]

Figure 1:
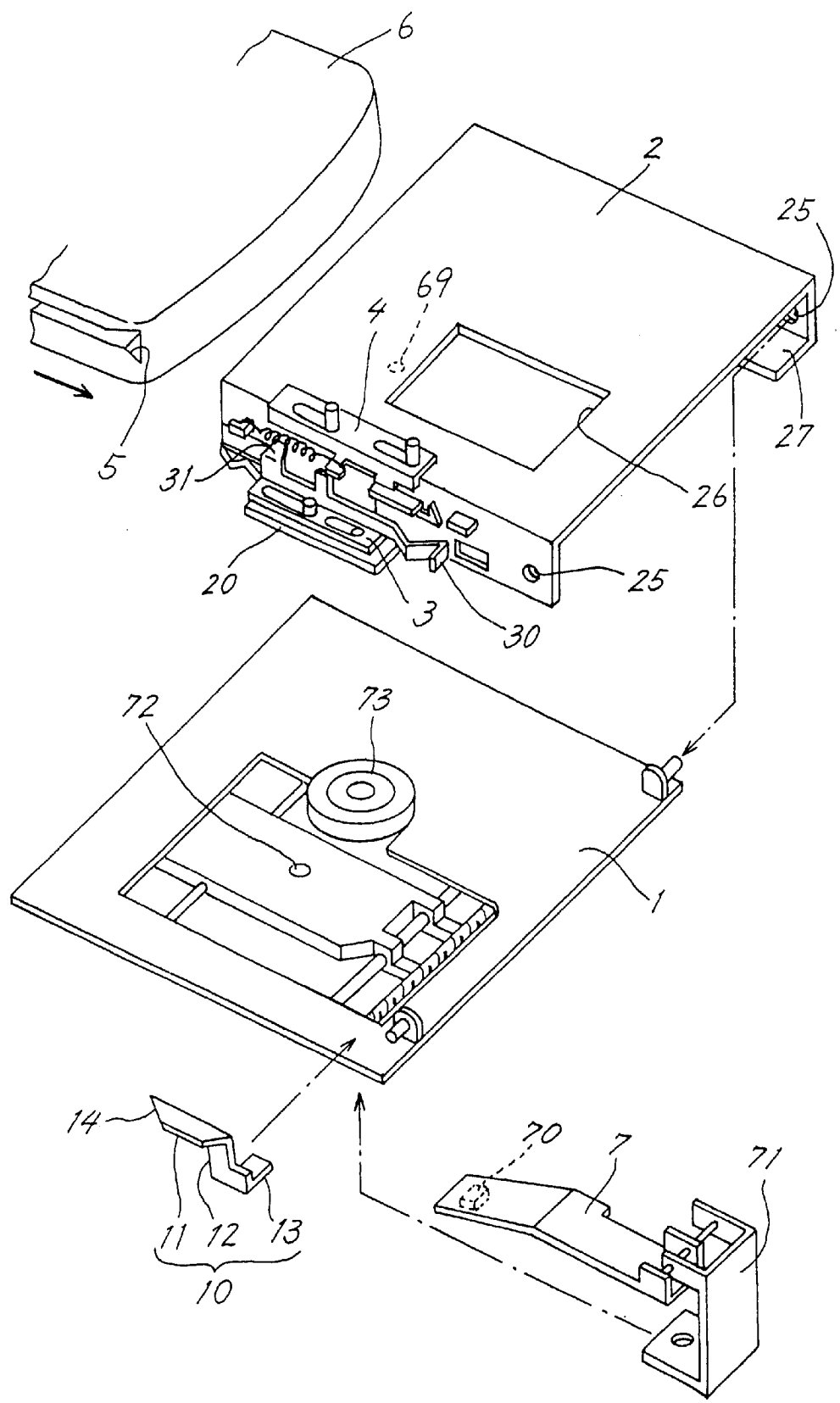
FIG. 1 is an exploded perspective view of a disk recording or reproduction device.

FIG. 1 is an exploded perspective view of the recording or reproduction device for disks. A holder 2 is pivoted as at 25 at one end thereof to a chassis 1 provided with a pickup 72, and the cartridge 6 is inserted into the holder 2. The pickup 72 is movable toward or away from a turntable 73. A bracket 71 is attached to the pickup 72. A head lever 7 provided with a recording head 70 at an outer end thereof is pivoted at a base end thereof to the bracket 71. The head lever 7 is advanced by a lift mechanism (not shown) into the holder 2 through an opening 26 formed in an upper wall of the holder 2. The recording head 70 is brought into contact with the disk 60 within the cartridge 6 to record signals thereon as is known well.

Release means 10 is provided at one corner of front end of the chassis 1. As will be described later, the release means 10 disengages the cartridge 6 from the holder 2 when the holder 2 as lowered is raised. The release means 10 is made from a metal plate by bending and in the form of an integral piece comprising a mount plate 13 in contact with the chassis 1, a support wall 12 projecting upward from the mount plate 13, and a release piece 11 extending from the upper end of the support wall 12 toward a cartridge unloading direction and slanting with respect to a plane in which the holder 2 moves pivotally. The release piece 11 is inclined upwardly outward and outwardly deflectable for deformation, with the support wall 12 serving as a base end portion. The release piece 11 has at a free end thereof an edge 14 so slanting as to give a width decreasing toward the cartridge unloading direction.

The holder 2 has a bearing plate 27 inwardly projecting from the lower end of a side plate thereof. The bottom wall of the cartridge 6 is placed on the support plate 27. The cartridge 6 is restrained from backlashing upward or downward within the holder 2 by the bearing plate 27 and a protrusion 69 provided on the rear side of top wall of the holder 2. Extending outward from the lower end of one side wall of the holder 2 is a support plate 20 for supporting thereon the slide member 3.

Figure 2:
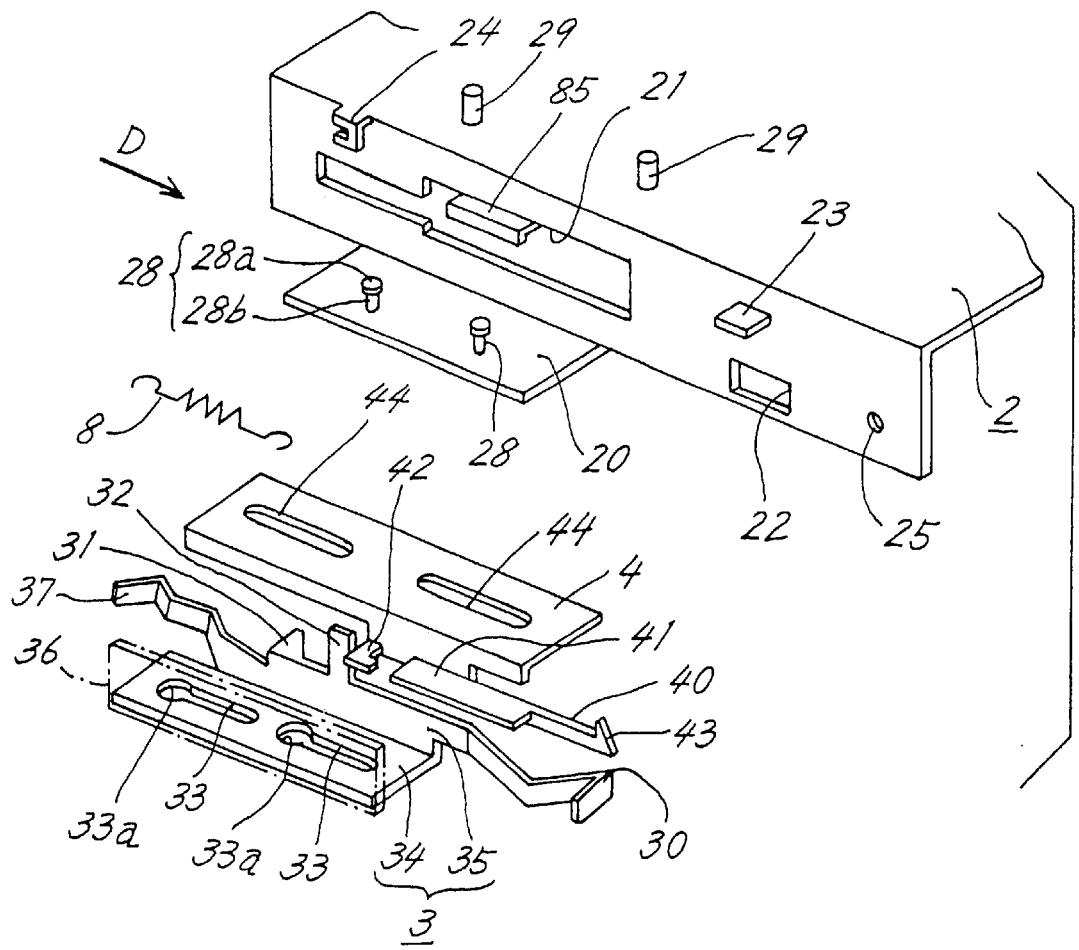
FIG. 2 is an exploded perspective view of a holder and a slide member.

FIG. 2 is an exploded perspective view of the holder 2 and the slide member 3. The slide member 3 comprises an over laid plate 34 having a vertical plate 35 extending upward from a side portion thereof. Slits 33 are formed in the overlaid plate 34. The slits 33 have fitted therein pins 28 projecting from the support plate 20, rendering the slide member 3 movable in the cartridge inserting and unloading directions. The pin 28 is a stepped pin comprising a small-diameter shank 28b and a flange 28a formed at the top end thereof. The slots 33 in the slide member 3 are each enlarged at one end to provide a large hole 33a having a slightly larger diameter than the flange 28a.

The slide member 3 is mounted on the support plate 20 by positioning each large hole 33a in register with the flange 28a and thereafter moving the slide member 3 rearward. The flanges 28a prevent the slide member 3 from slipping off. A restraining piece 85 extends outward beyond an upper edge of an apertured portion 21 of the holder 2, and the vertical plate 35 of the slide member 3 is positioned inwardly of the restraining piece 85. The slide member 3 is prevented from backlashing outward by the restraining piece 85.

A lock slide 4 is disposed above the slide member 3. The lock slide 4 is provided with slits 44, 44 having fitted therein pins 29, 29 projecting from the upper wall of the holder 2, whereby the lock slide 4 is made movable in the cartridge inserting and unloading directions.

The slide member 3 of FIG. 2 is made from a metal plate by bending and is in the form of an integral piece comprising a tooth 31 projecting inward from the rear end of the vertical plate 35, a projection 32 extending upward from the approximate midportion of length of the vertical plate 35, a latch 30 positioned at the front end of the vertical plate 35 and having an inwardly projecting end, and a spring piece 37 extending rearward from the rear end of the vertical plate 35. The tooth 31 advances into the holder 2 to come into contact with an end face of the shutter 61, and the spring piece 37 fits to the shutter 61.

The lock slide 4 is formed from a metal plate by bending and integrally has an engaging hook 40 extending from the lengthwise midportion thereof toward its front end, and a spring retainer 42 projecting outward from the approximate midportion of length thereof. The engaging hook 40 is elastically deformable downward and has a slope 43 at its outer end. A push plate 41 extends outward from the hook 40 in the vicinity of its base end.

The holder 2 has the aperture 21 for the tooth 31 to move in and a hole 22 positioned forwardly of the aperture 21. The latch 30 fits into the hole 22, with the cartridge 6 inserted into the holder 2 completely. A lug 23 with which the hook 40 is engageable projects outward from the holder 2 above the hole 22.

A hook 24 is provided on the holder 2 at the rear end thereof. The lock slide 4 is biased rearward by a tension spring 8 engaged with the hook 24 and the spring retainer 42 of the lock slide 4. The contact of the front ends of the slit portions 44 with the pins 29 restrains the lock slide 4 from moving rearward. The projection 32 of the slide member 3 bears on the rear side of the spring retainer 42 and is pulled along with the lock side 4 by the tension spring 8. The biasing force of the tension spring 8 is greater than the shutter biasing force of the torsion spring 66 inside the cartridge 6.

The cartridge 6 is inserted into the holder 2 as pivotally moved upward. Signals are recorded on the disk or reproduced therefrom, with the cartridge 6 positioned as opposed to the chassis 1 by the downward pivotal movement of the holder 2. The head lever 7 will not be described below for convenience of description.

Figure 4A:
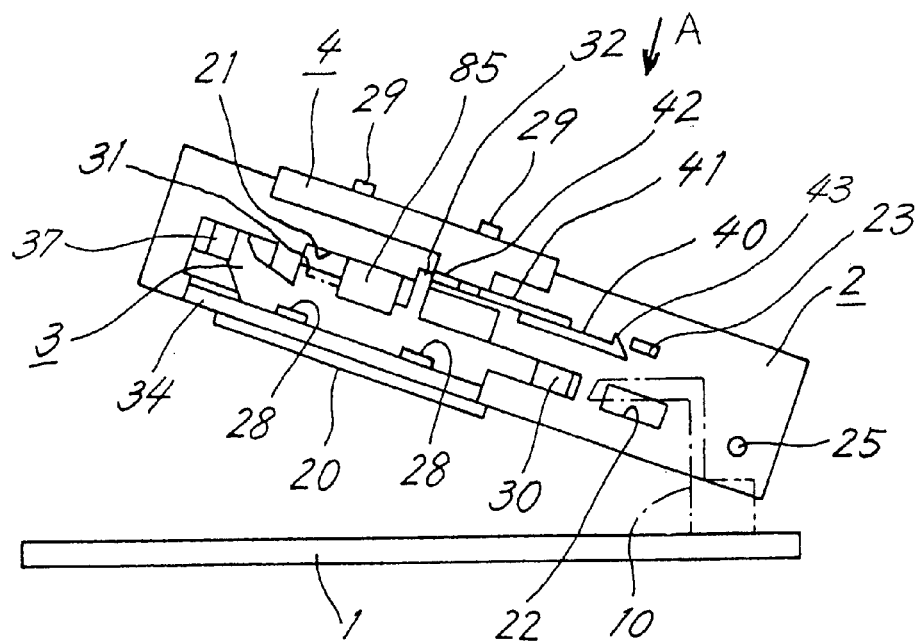
FIGS. 4A, 4B are side elevations of the holder in a raised position, FIG. 4A showing the holder before being loaded with the cartridge, FIG. 4B showing the holder with the cartridge inserted therein completely.
Figure 4B:
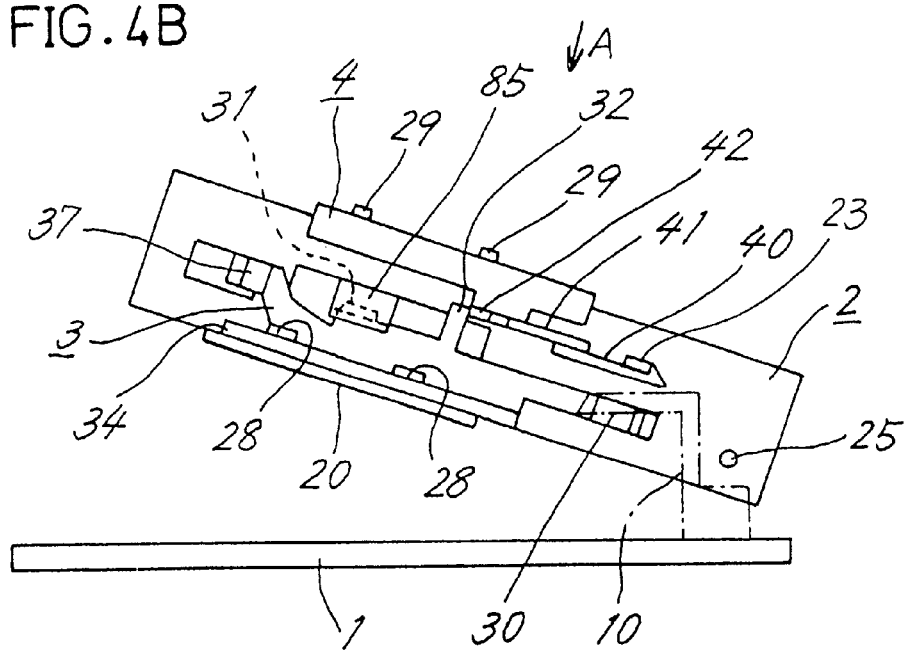

FIGS. 4A, 4B are side elevations of the holder 2 in a raised position, FIG. 4A showing the holder before being loaded with the cartridge 6, FIG. 4B showing the holder with the cartridge 6 inserted therein completely. Before the cartridge 6 is inserted, the engaging hook 40 is positioned to the rear of the lug 23. The latch 30 is positioned to the rear of the hole 22 in the holder 2 and deflected outward in contact with the side wall of the holder 2.

A description will be given below of the insertion of the cartridge 6 and the upward and downward movement of the holder 2.

[Inserting the Cartridge]

Figure 5A:
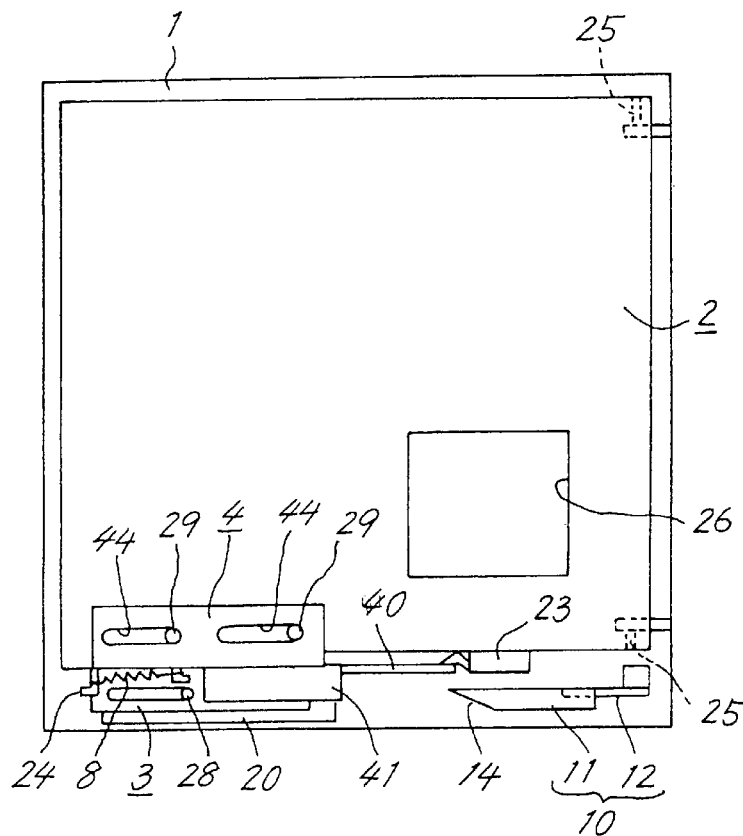
FIGS. 5A, 5B are views showing the holder of FIGS. 4A, 4B, respectively, as it is seen from the direction A.
Figure 5B:
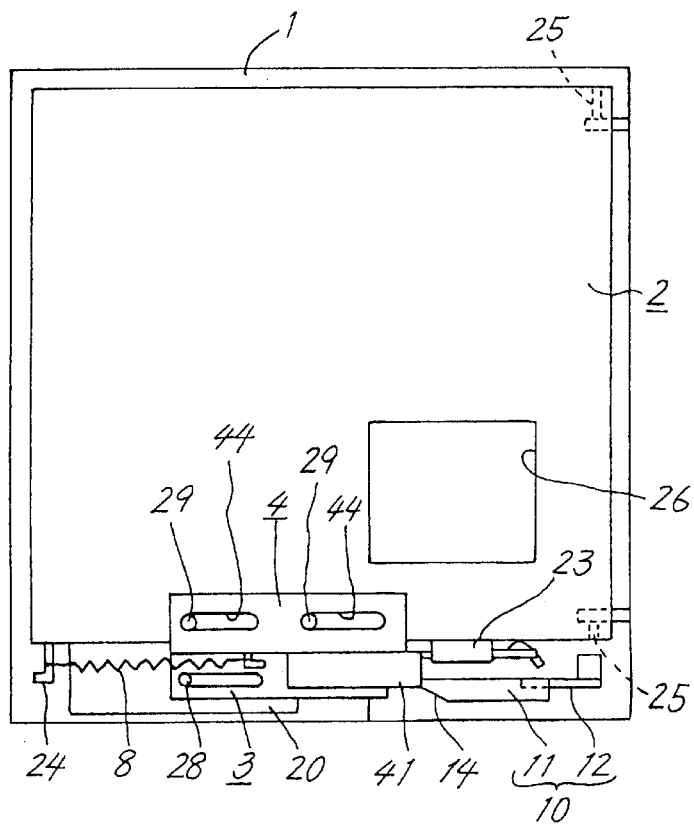
Figure 6A:
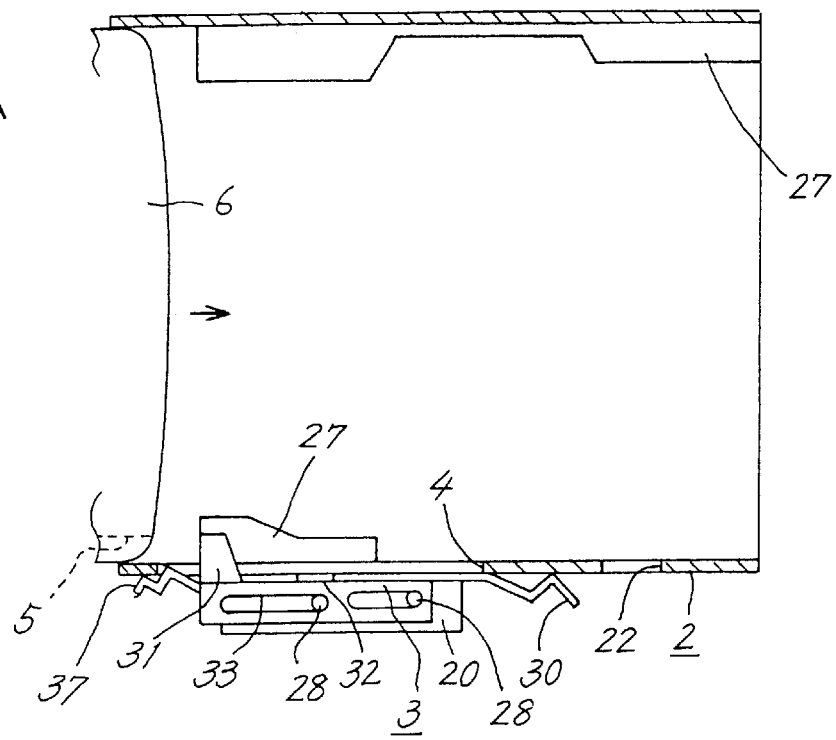
FIGS. 6A, 6B are sectional views of the holder of FIG. 4A as it is seen from the direction A, FIG. 6A showing the holder before being loaded with the cartridge, FIG. 6B showing the holder while a shutter is being opened.
Figure 6B:
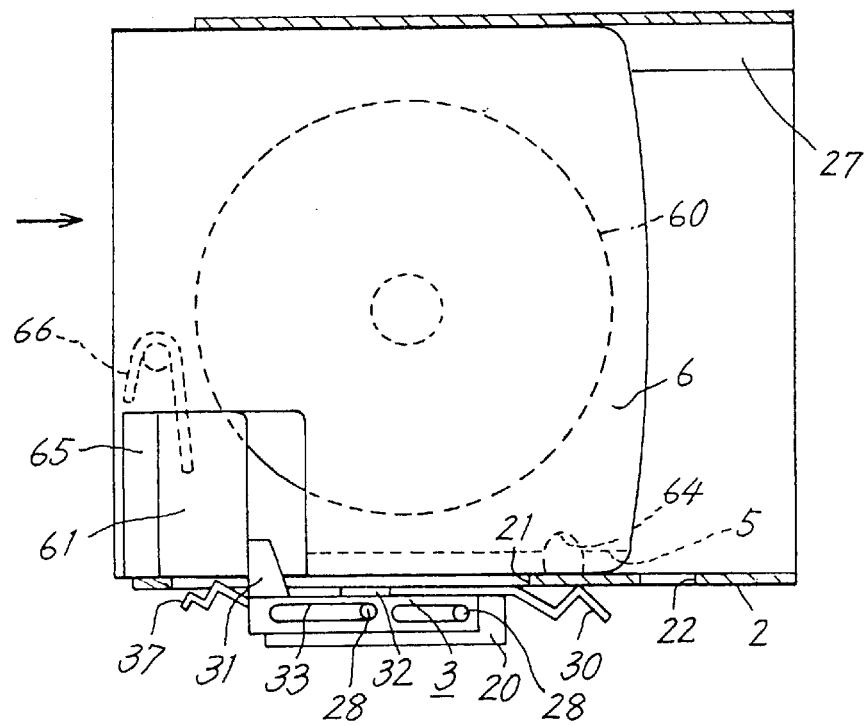
Figure 7A:
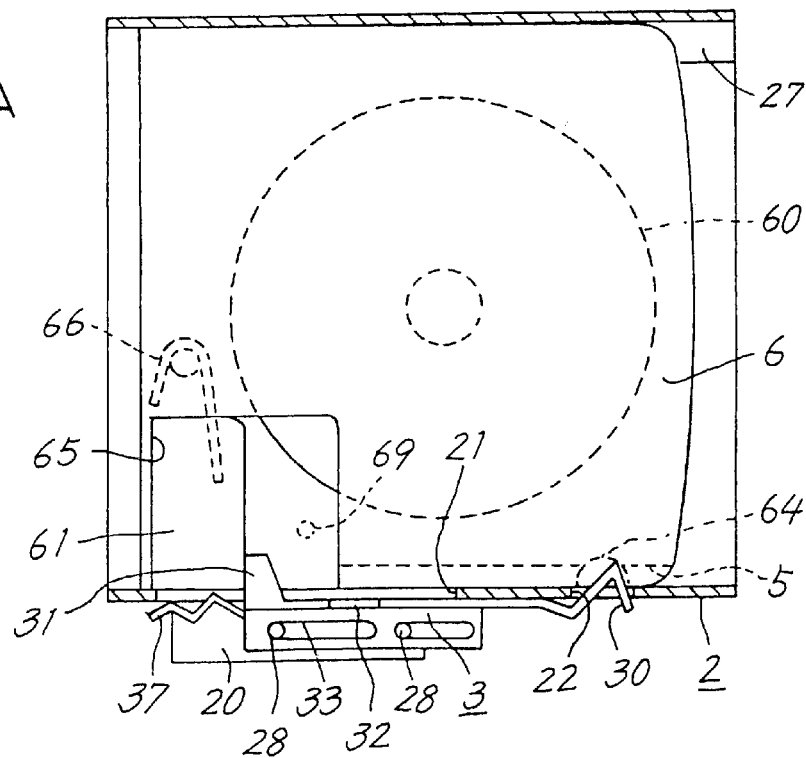
FIGS. 7A, 7B are sectional views of the holder of FIG. 4B as it is seen from the direction A, FIG. 7A showing the same with a latch fitted in the cartridge, FIG. 7B showing the same with the latch released from the cartridge.
Figure 7B:
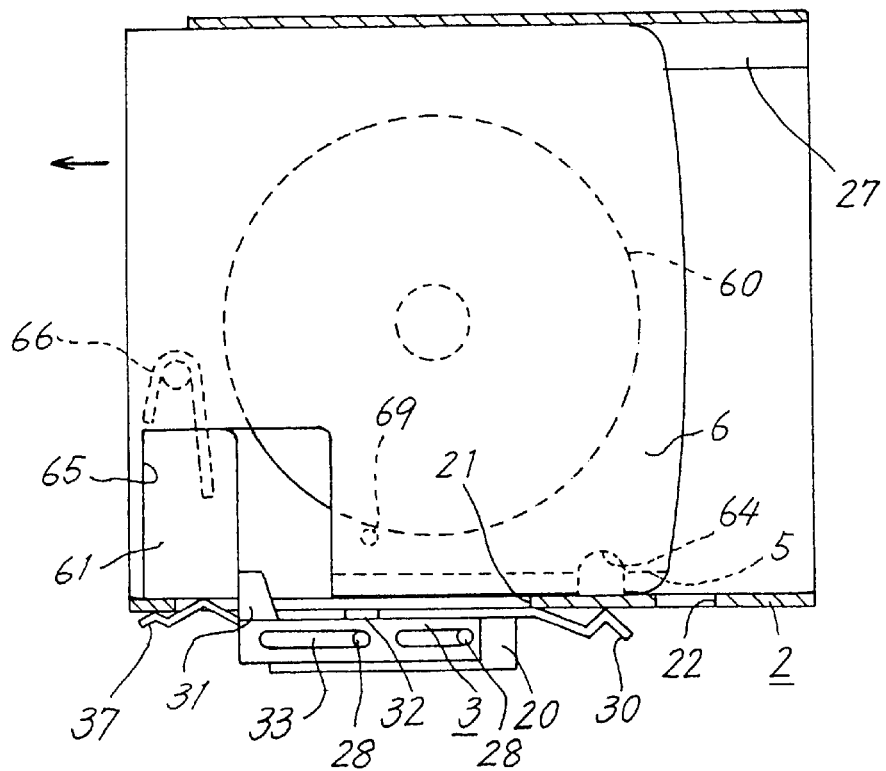

FIGS. 5A, 5B are views showing the holder 2 of FIGS. 4A, 4B as it is seen from the direction A. FIGS. 6A, 6B are sectional views of the holder 2 of FIG. 4A as it is seen from the direction A. FIGS. 7A, 7B are sectional views of the holder 2 of FIG. 4B as it is seen from the direction A. For convenience of illustration, the lock slide 4 and the tension spring 8 are not shown in FIGS. 6A, 6B, 7A, 7B.

Before the cartridge is inserted as shown in FIG. 5A, the engaging hook 40 is positioned inwardly of the release means 10, which will not interfere with the movement of the lock slide 4.

When the cartridge 6 is inserted into the holder 2 from the state shown in FIG. 6A, the tooth 31 of the slide member 3 fits into the slit 5 of the cartridge 6 and comes into contact with the shutter 61. Since the force of the tension spring 8 biasing the slide member 3 rearward is greater than the force of the torsion spring 66 of the cartridge 6, the slide member 3 remains unmoved as seen in FIG. 6B even if the cartridge 6 is pushed. The shutter 61 is opened against the torsion spring 66.

When the shutter 61 is opened completely, the shutter 61 is brought into contact with the rear edge of the recessed portion 65 as seen in FIG. 7B. The latch 30 does not reach the hole 22 since the slide member 3 remains unmoved.

The cartridge 6 is further pushed in. The shutter 61, which does not open further, pushes the tooth 31 of the slide member 3, advancing the slide member 3 to fit the latch 30 into the hole 22 as seen in FIG. 7A. The latch 30 inserted through the hole 22 lightly engages in the caved portion 64 of the cartridge 6, holding the cartridge 6 completely inserted in the holder.

On the other hand, the projection 32 of the slide member 3 shown in FIG. 4A is in contact with the spring retainer 42 of the lock slide 4, so that the lock slide 4 advances against the tension spring 8 when the slide member 3 is pushed. The slope 43 of the engaging hook 40 in the state shown in FIG. 4A comes into contact with the lug 23, whereby the hook 40 is deformed by downward deflection. Upon the slope 43 moving past the lug 23, the engaging hook 40 restores itself elastically, coming into engagement with the lug 23 as shown in FIG. 4B.

The engagement of the hook 40 with the lug 23 restrains the lock slide 4 from moving in the cartridge unloading direction, and the cartridge 6 is held engaged by the latch 30. With the latch 30 fitting in the hole 22 of the holder 2, the slide member 3 is unlikely to move out of the holder 2 inadvertently.

As shown in FIG. 5B, the lock slide 4 has its push plate 41 positioned above the release piece 11, with the cartridge completely inserted in the holder.

[Lowering the Holder]

Figure 8A:
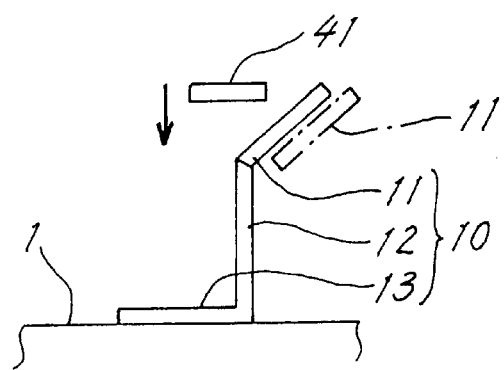
FIG. 8A is a front view of a release means.
Figure 8B:
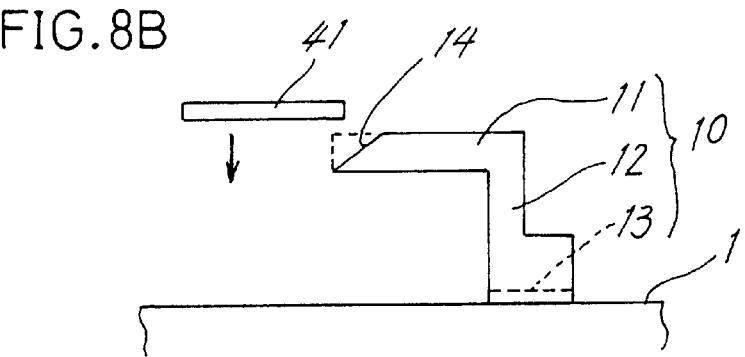
FIG. 8B is a right side elevation of the release means.

For recording or playback, the holder 2 is pivotally moved down, with the cartridge completely inserted in the holder 2. FIG. 8A is a front view of the release means 10, and FIG. 8B is a right side elevation of the release means 10. When the lock slide 4 is moved down with the descent of the holder 2, the push plate 41 of the lock slide 4 comes into contact with the slanting edge 14 of the release piece 11 as shown in FIG. 5B and FIGS. 8A, 8B. Since the engaging hook 40 is restrained from deflecting upward and deforming by contact with the lug 23 (see FIG. 4B), the release piece 11 deflects outward as shown in FIG. 8A to permit passage of the push plate 41. The position to which the release piece 11 is outwardly deflected for deformation will be referred to as the deflected position.

The release piece 11 is brought into contact with the slanting edge 14 for the following reason. The push plate 41 is likely to be positioned above the release piece 11 owing to an error in mounting the holder 2 or dimensional variations of components. If the slanting edge 14 is not formed as indicated by a chain line in FIG. 8B, the release piece 11 will not be deflected laterally, i.e., outward, for deformation merely by being depressed at its upper end by the push plate 41 when the holder 2 is lowered. It is therefore likely that the push plate 41 will be unable to move past the release piece 11.

According to the present embodiment, however, the push plate 41 lowers while pushing the slanting edge 14, even if the position where the holder is mounted somewhat differs from device to device. The release piece 11 accurately escapes sideways. This enables the push plate 41 to move past the release piece 11 reliably.

Figure 10A:
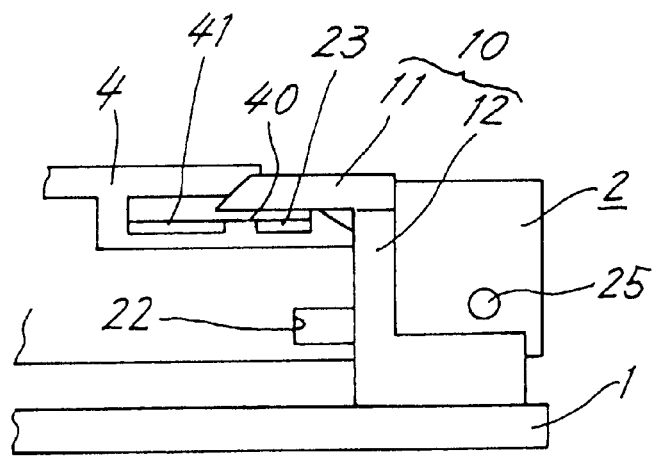
FIGS. 10A, 10B are side elevations of the release means and an engaging hook.
Figure 10B:
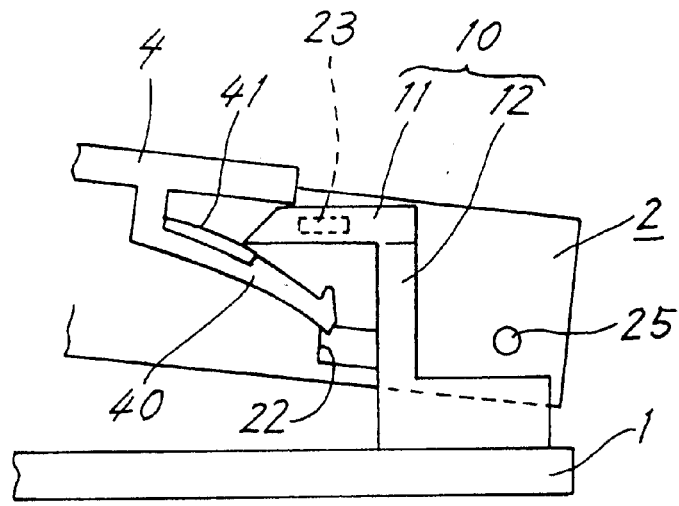
Figure 11A:
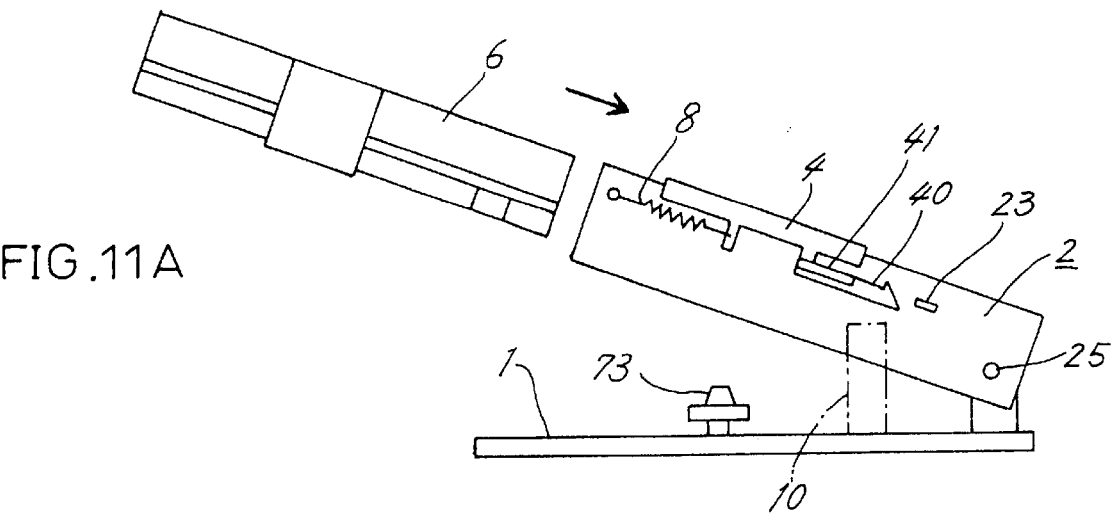
FIGS. 11A, 11B, 11C are side elevations of a conventional signal recording or reproduction device for disks, FIG. 11A showing a holder as raised, FIG. 11B showing the holder as completely lowered, FIG. 11C showing the holder while being raised.
Figure 11B:
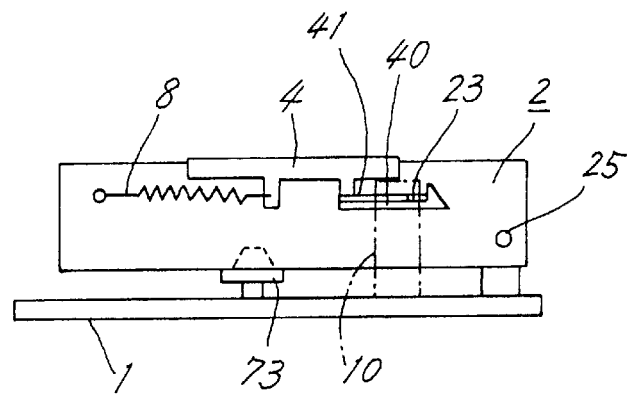
Figure 11C:
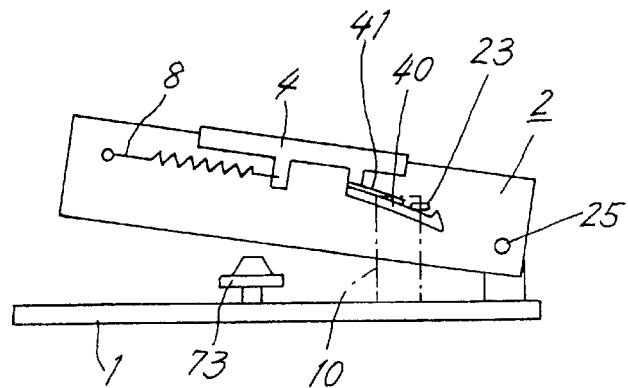

FIGS. 10A, 10B are enlarged side elevations of the release means 10 and the engaging hook 40. Upon the push plate 41 moving past the release piece 11, the release piece 11 restores itself elastically to return to the original position, i.e., to a standby position.

[Raising the Holder]

The holder 2 is pivotally moved upward when the cartridge 6 is to be unloaded from the holder 2.

When the holder 2 is pivotally raised, the push plate 41 of the lock slide 4 comes into contact with the lower end of the release piece 11 as seen in FIG. 10B. The release piece 11 is opposed to a plane in which the holder 2 is pivotally moved upward and downward and is therefore not readily deflectable upward or downward. Accordingly, the release piece 11 deflects the engaging hook 40 downward for deformation by contact with the push plate 40, releasing the hook 40 form engagement with the lug 23. The lock slide 4 is moved in the cartridge unloading direction by the tension spring 8. The lock slide 4 pushes the projection 32 of the slide member 3 rearward as shown in FIG. 4A to unload the cartridge 6.

The unloading movement of the cartridge 6 is described by the applicant in Japanese Patent Application No. 11-74770 (which is an invention not laid open) and will not be described in detail.

According to the present embodiment, the release piece 11 has a length extending generally in parallel to the cartridge inserting-unloading direction and is therefore greatly deformable by deflecting laterally, i.e., outward, about its base end portion. This makes it possible to provide a great allowance for the engagement of the lock slide 4 with the releases piece. Accordingly, the lock slide 4 can be released from engagement with the holder 2 with good stability.

Further the space for the provision of the release piece 11 needs only to have a lateral width corresponding to the amount of lateral deflective deformation thereof permitting the passage of the lock slide 4, so that the lateral width can be shortened.

Figure 9:
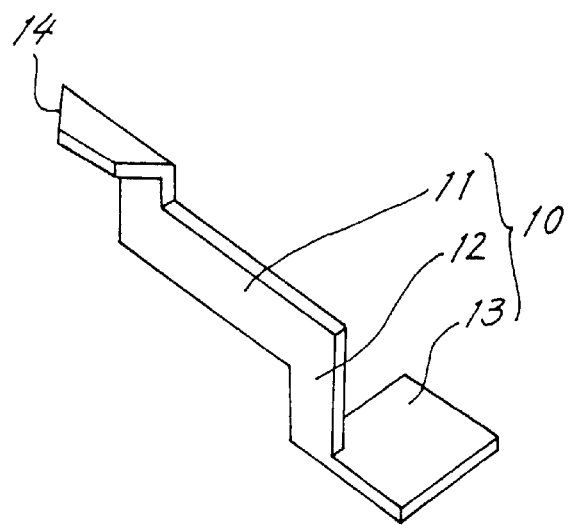
FIG. 9 is a perspective view of another release means.

Incidentally, the release piece 11 of the release means 10 needs only to be such that it is outwardly deflectable for deformation with the support wall 12 serving as its base end portion. As shown in FIG. 9, therefore, the release piece 11 may extend straight rearward from the support wall 12, with its forward end only inclined.

INDUSTRIAL APPLICABILITY

[Lowering the Holder]

When the holder 2 is pivotally moved down from its raised position, the lock slide 4 comes into contact with the release piece 11, deflecting the release piece 11 laterally, i.e., outward, for deformation. The release piece 11 permits passage of the lock slide 4 and elastically restores itself to return to the original position upon passage of the lock slide 4.

[Raising the Holder from Lowered Position]

When the holder 2 is raised, the lock slide 4 deflects for deformation by contact with the lower end of the release piece 11. The lock slide 4 is disengaged from the holder 2.

The release piece 11 has a large length extending in the cartridge inserting-unloading direction and is therefore greatly deformable by deflecting outward about its base end portion, so that the allowance for the engagement of the lock slide 4 with the release piece can be made great. This renders the lock slide 4 releasable from engagement with the holder 2 with good stability.

Figure 12:
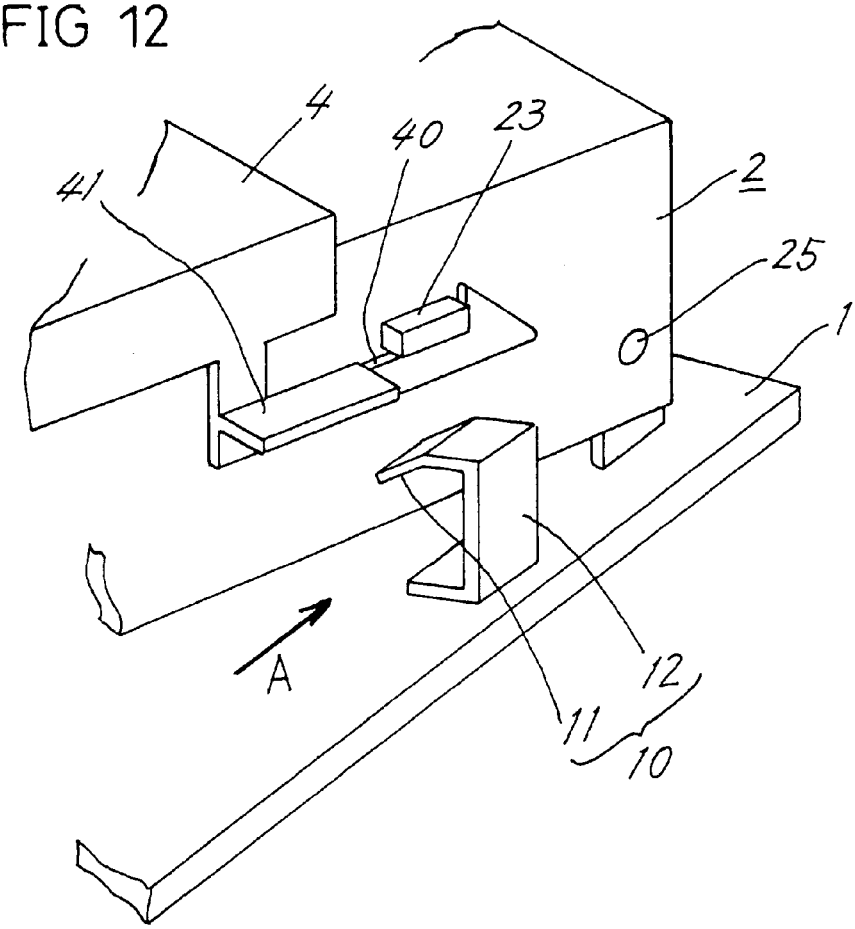
FIG. 12 is a perspective view of conventional release means and the holder.
Figure 13:
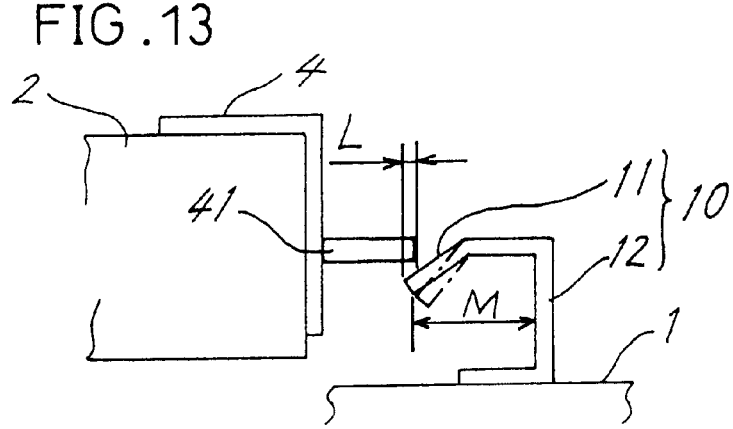
FIG. 13 is a front view of the conventional release means.

Furthermore, the lateral width of the space for the provision of the release piece 11 needs only to correspond to the amount of lateral deflective deformation thereof permitting the passage of the lock slide 4. The lateral width of the space for the installation of the release piece 11 in the prior art must not be smaller than the length of the release piece 11 as shown in FIG. 12. Accordingly, the lateral width can be made smaller than conventionally.

What is claimed is:

1. A signal recording or reproduction device for disks which comprise a holder pivoted at a base end thereof to a chassis and pivotally movable for accommodating therein a cartridge enclosing a disk therein, a lock slide mounted on the holder and movable in cartridge inserting and unloading directions, the lock slide being movable with the insertion of the cartridge to engage with the holder, and release means for disengaging the lock slide from the holder when the holder is pivotally moved upward from a lowered position, the signal recording or reproducing device being characterized in that:

the release means has a release piece slanting with respect to the plane of pivotal movement of the holder and attached at a base end thereof to the chassis, the release piece being elastically deformable outward and extending from the base end approximately in parallel to the cartridge inserting-unloading directions, the release piece being movable between a deflected position to which the release piece is elastically deformed outward in a plane parallel to the chassis by being pushed by the lock slide when the holder is lowered to permit passage of the lock slide and a standby position in which the release piece restores itself elastically and disengages the lock slide from the holder by coming into contact with the lock slide when the holder is pivotally moved upward from the lowered position.

2. A signal recording or reproduction device for disks according to claim 1 wherein the holder is provided with a lug for the lock slide to engage with, and when the holder is pivotally moved down, the lock slide comes into contact with the release piece while in engagement with the lug and is restrained from deforming by deflection.

3. A signal recording or reproduction device for disks which comprise a holder pivoted at a base end thereof to a chassis and pivotally movable for accommodating therein a cartridge enclosing a disk therein, a lock slide mounted on the holder and movable in cartridge inserting and unloading directions, the lock slide being movable with the insertion of the cartridge to engage with the holder, and release means for disengaging the lock slide from the holder when the holder is pivotally moved upward from a lowered position, the signal recording or reproducing device being characterized in: that:

the release means has a release piece slanting with respect to the plane of pivotal movement of the holder and attached at a base end thereof to the chassis, the release piece being elastically deformable outward and extending from the base end approximately in parallel to the cartridge inserting-unloading directions, the release piece being movable between a deflected position to which the release piece is elastically deformed outward by being pushed by the lock slide when the holder is lowered to permit passage of the lock slide and a standby position in which the release piece restores itself elastically and disengages the lock slide from the holder by coming into contact with the lock slide when the holder is pivotally moved upward from the lowered position, wherein the portion of the release piece to be brought into contact with the lock slide is a slanting edge so inclined that the release piece has a width decreasing toward the cartridge unloading direction.

* * * * *